(No Model.)
J. H. EGAN.
WARMING PAN.
No. 244,116.                    Patented July 12, 1881.
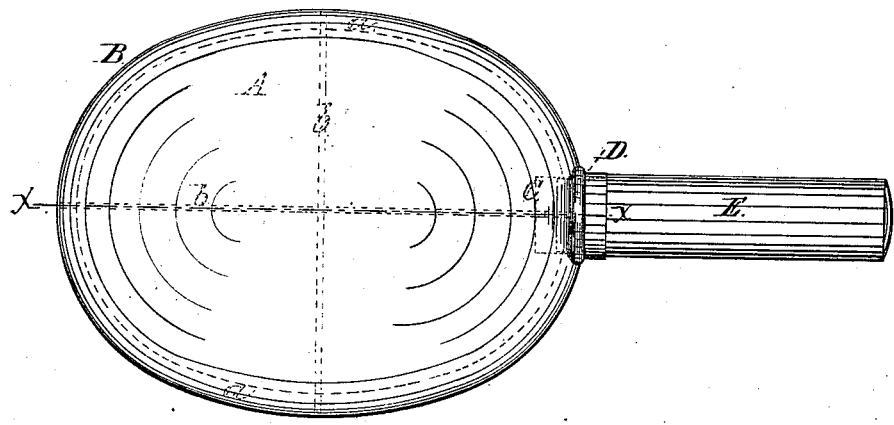
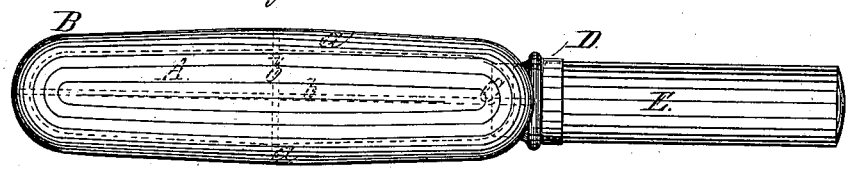
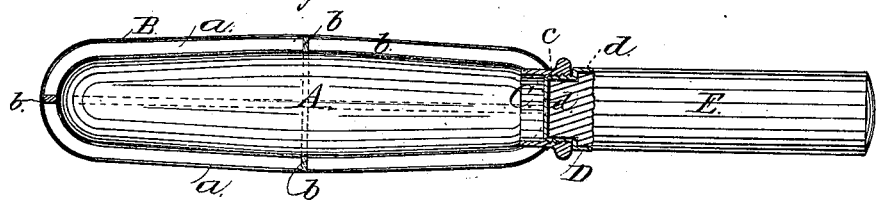
WITNESSES:
Emile A. Bru
Oscar Schoenfeld
INVENTOR
James H. Egan
BY W. Donn
ATTORNEY

UNITED STATES PATENT OFFICE.

JAMES H. EGAN, OF ST. JOHNSVILLE, NEW YORK.

WARMING-PAN.

SPECIFICATION forming part of Letters Patent No. 244,116, dated July 12, 1881.

Application filed December 4, 1880. (No model.)

*To all whom it may concern:*

Be it known that I, JAMES H. EGAN, a citizen of the United States, residing at St. Johnsville, in the county of Montgomery and State of New York, have invented a new and useful Warming-Pan, of which the following is a specification.

My invention relates to improvements in apparatus for warming beds, lounges, carriages, and for other similar purposes; and the object thereof is to provide an apparatus for the purpose which may be conveniently handled, is perfectly safe, and that will give out heat regularly and slowly.

The invention consists of a vessel adapted to receive and hold hot water, incased in an outer shell or case, with an air-space between the walls; also, in providing the inner vessel with a filling-tube projecting through the walls of the case or shell, and provided with a suitable stopper, so that water can be readily supplied to the inner vessel, and the apparatus can be placed in any position without danger of leakage; also, in providing the apparatus with a handle with which it can be safely and easily manipulated; lastly, it consists in forming the apparatus so that it will give out heat equally in every direction, and in giving it a shape that will permit it to be placed in the bed or lounge without inconveniencing the occupant and without liability of changing its position.

In the accompanying drawings, Figure 1 represents a plan of my improved warming-pan. Fig. 2 represents an edge elevation of the same, and Fig. 3 represents a longitudinal section taken on line $x$ $x$ of Fig. 1.

Referring to the drawings, A represents the water-vessel of the warming-pan; B, the case or shell inclosing the same.

Between the vessel A and case B is an air-space, $a$, by which they are practically insulated from each other; but to hold the vessel A rigidly in place ribs or stays $b$ are provided, which sustain the said vessel, and at the same time support the shell B and prevent it from collapsing or yielding when subjected to external pressure. By this arrangement it will be observed that the water-vessel A is surrounded in every direction (except for the small space occupied by the filling-tube hereinafter described) by an air-space, $a$, the air in which serves as a non-conducting envelope, which prevents too rapid radiation of heat from the hot water within the vessel, and also prevents the warming-pan from sweating and communicating dampness to surrounding objects. This mode of placing and fixing the water-vessel in the case affords double walls and an air-space to every part of the radiating-surface of the warming-pan, and thereby an equable uniform heat is communicated to the exterior air.

C represents the filling-tube, which is passed through the walls of the vessel A and shell B, so as to open from the outside of the pan to the interior of the vessel A. Through this tube hot water is poured into the vessel A, so that there is no danger of any escaping into the air-space $a$ and rusting the walls. This is prevented by connecting the said tube with the walls of the shell and vessel and leaving no opening from the tube into the space $a$.

The stopper D, by which the filling-tube is closed, may be provided with a socket-head or part, $d$, for the connection of the handle E, by which the warming-pan is conveyed about and handled. This construction of the warming-pan makes it extremely light and easy to handle, as it may be made of thin metal. The air-space, without adding anything to the weight or cost of the pan, affords an ample non-conducting envelope, so that a gentle uniform heat is radiated from the pan.

By fixing the vessel in the case or shell the durability of the pan and the convenience of handling it are greatly enhanced, and the air-space is kept of uniform width, and thus the radiating-surface is kept of uniform extent.

The top and bottom of the warming-pan, which are shown to be convex, may be flattened, if desired; and if a foot-warmer is required the handle may be removed and the pan used for that purpose.

I claim—

1. In a hot-water warming-pan, the combination of the inner water-vessel, A, and outer shell, B, insulating air-space $a$, supporting-ribs $b$, filling-tube C, and stopper D, so arranged that the vessel A is held rigidly in position within the shell B, surrounded on every side by a non-conducting envelope of air in space $a$, substantially as herein shown and described.

2. The stopper D, provided with a socket, $d$, and handle E, in combination with the inner vessel, A, case B, and connecting filling-tube C, substantially as herein shown and described.

JAMES HENRY EGAN.

Witnesses:
J. M. HUBBARD,
J. H. MARKELL.